(12) United States Patent
Poisner et al.

(10) Patent No.: US 7,130,992 B2
(45) Date of Patent: Oct. 31, 2006

(54) DETECTING INSERTION OF REMOVABLE MEDIA

(75) Inventors: David I. Poisner, Folsom, CA (US); Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 09/822,684

(22) Filed: Mar. 30, 2001

(65) Prior Publication Data
US 2002/0144025 A1    Oct. 3, 2002

(51) Int. Cl.
*G06F 9/00* (2006.01)
(52) U.S. Cl. .......................................... 713/1; 713/100
(58) Field of Classification Search .................... 713/1, 713/100
See application file for complete search history.

(56) References Cited

U.S. PATENT DOCUMENTS

| | | | |
|---|---|---|---|
| 4,720,784 A * | 1/1988 | Radhakrishnan et al. ... | 710/107 |
| 4,773,036 A * | 9/1988 | Berens et al. ............... | 711/112 |
| 4,930,068 A * | 5/1990 | Katayose et al. ........... | 710/261 |
| 5,057,998 A * | 10/1991 | Hirokawa .................... | 709/213 |
| 5,202,998 A * | 4/1993 | Yanes .......................... | 710/267 |
| 5,331,423 A * | 7/1994 | Ota et al. .................... | 386/125 |
| 5,384,912 A * | 1/1995 | Ogrinc et al. ............... | 345/501 |
| 5,414,858 A * | 5/1995 | Hoffman et al. ............. | 710/48 |
| 5,463,752 A * | 10/1995 | Benhase et al. ............. | 711/154 |
| 5,528,566 A * | 6/1996 | McGee et al. ........... | 369/30.86 |
| 5,675,833 A * | 10/1997 | Radko et al. ................. | 710/17 |
| 5,694,606 A * | 12/1997 | Pletcher et al. ............. | 710/261 |
| 5,822,595 A * | 10/1998 | Hu .............................. | 710/264 |
| 6,094,720 A * | 7/2000 | Cromer et al. ................. | 713/1 |
| 6,117,186 A * | 9/2000 | Wydall et al. ............... | 717/174 |
| 6,145,007 A * | 11/2000 | Dokic et al. ................. | 709/230 |
| 6,178,520 B1 * | 1/2001 | DeKoning et al. ............. | 714/5 |
| 6,189,050 B1 * | 2/2001 | Sakarda ........................ | 710/18 |
| 6,366,966 B1 * | 4/2002 | Laney et al. .................. | 710/18 |
| 6,385,704 B1 * | 5/2002 | Rao et al. .................... | 711/151 |
| 6,405,362 B1 * | 6/2002 | Shih et al. ................... | 717/174 |

OTHER PUBLICATIONS

Tanenbaum, Andrew S., "Structured Computer Organization", 1984, Prentice Hall, 2nd Edition, p. 11.*
Arnold, Matt, "can autorun.inf be hidden?", Oct. 19, 1996, Newsgroup comp.os.ms-windows.programmer.misc, Message-ID marnoldDzIG2w.MqJ@netcom.com.*
Computer Bob, "auto-insert notification?", Jun. 26, 1998, Newsgroup comp.publish.cdrom.hardware, Message-ID 35a00f3e.22399685@news.wa.net.*
Homecooking, "auto-insert notification?", Jun. 26, 1998, Newsgroup comp.publish.cdrom.hardware, Message-ID 01bda103$140c82e0$4ff14ec1@pluto.*

* cited by examiner

*Primary Examiner*—A. Elamin
*Assistant Examiner*—Tse Chen
(74) *Attorney, Agent, or Firm*—Blakely, Sokoloff, Taylor & Zafman LLP

(57) ABSTRACT

The present invention is a method and system to automatic loading program on a medium into memory for execution. In one embodiment, a mode word is configured. The insertion of the medium into a drive is detected based on the mode word. A program on the medium is started when insertion is detected. In another embodiment, a polling circuit in a chipset detects the insertion of the medium into the drive. A status bit is checked in response to an interrupt generated by the polling circuit. A flag in a memory is updated based on the status bit. A poll request by an operating system is responded.

10 Claims, 7 Drawing Sheets

DETECTING INSERTION OF REMOVABLE MEDIA

SUMMARY

1. Field of the Invention

This invention relates to mass storage. In particular, the invention relates to removable media.

2. Background of the Invention

Systems running on various operating systems periodically poll removable media devices such as a Compact Disk Read Only Memory (CD-ROM) to detect if the new media has been inserted into the drive. This capability allows the operating system to automatically start running software on the medium. For example, a program on a CD-ROM can automatically start when the disk is inserted and the tray is shut. This saves the user from having to manually start the program.

However, in order to enable this capability, the software has to periodically poll the drive. This polling takes up bandwidth from the central processing unit (CPU), and introduces occasional latencies to other applications. The polling sequence involves a series of operations including issuing a command to the drive, waiting for the interrupt, and checking the result. The interrupts and input/output (I/O) read operations take a significant amount of CPU resources.

Therefore, there is a need for a technique to detect insertion of removable media.

BRIEF DESCRIPTION OF THE DRAWINGS

The features and advantages of the present invention will become apparent from the following detailed description of the present invention in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For examples, although the description of the invention is directed to the integrated drive electronics (IDE) hard drive, the invention can be practiced for other mass storage devices having similar characteristics.

Figure 1:
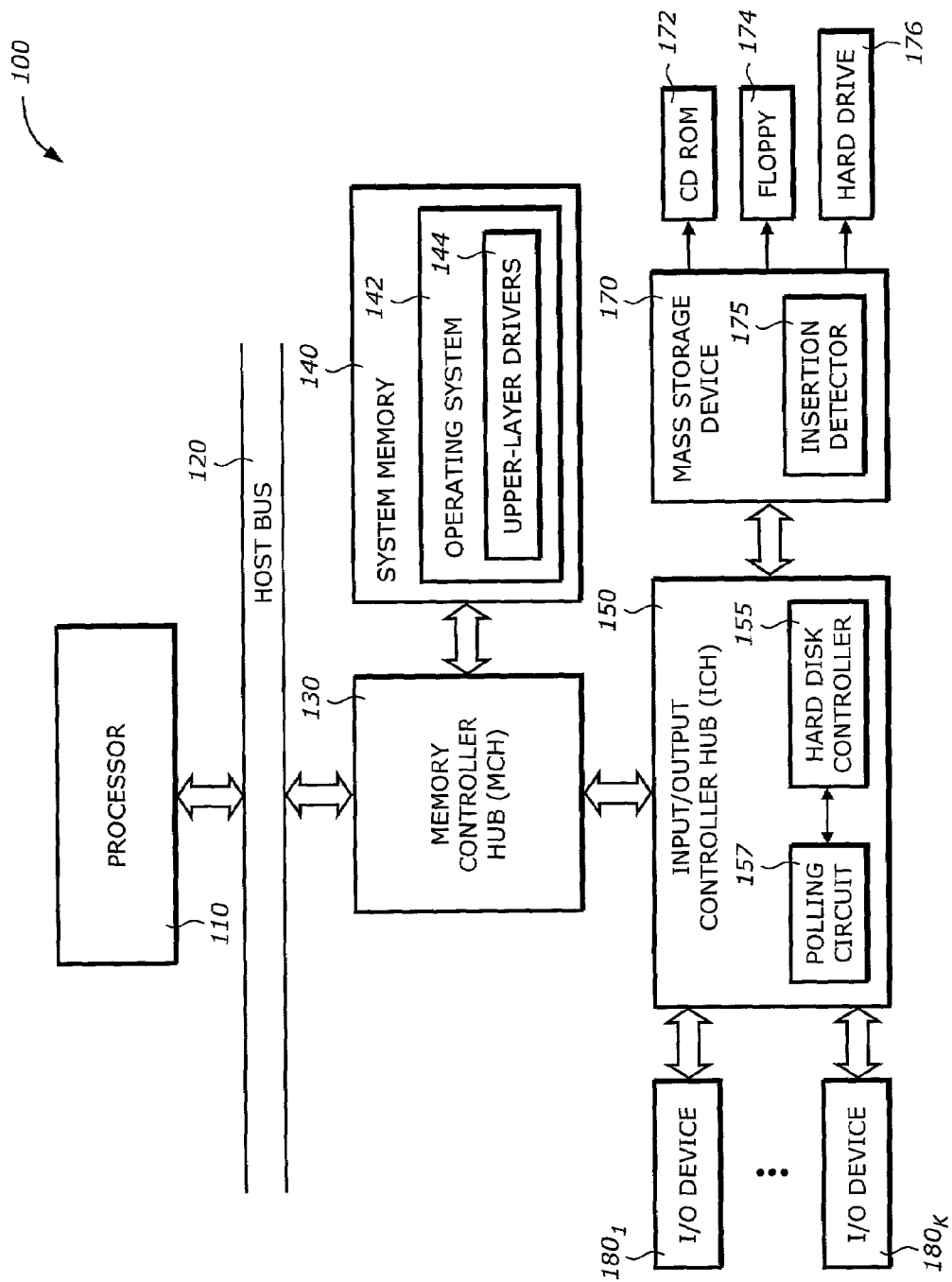
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a system memory 140, an input/output control hub (ICH) 150, a mass storage device 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory 140 includes an operating system 142, which may contain upper-layer drivers 144. The system memory 140 may also include other programs or data, which are not shown depending on the various embodiments of the invention. These programs may include a program boot-up driver or a lower-layer device driver to be described later. The instruction code stored in the memory 140, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. The ICH includes a mass storage controller or disk controller 155 to control the mass storage device 170. In one embodiment, the ICH 150 includes a polling circuit 157 to poll the mass storage device 170 to determine if a medium is inserted into the mass storage device 170.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The mass storage device 170 may include an IDE or an Advanced Technology Attachment (ATA) drive according to various embodiments of the invention. In one embodiment, the mass storage device includes an insertion detector 175 to detect if a medium (e.g., a CD-ROM) is inserted into the drive. Note that various embodiments of the invention may include either the insertion detector 175 or the polling circuit 157, or both, or neither.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a routine, a subroutine, a module, a software package, a class, or any combination of instructions, data structures, or program statements. A code segment may be coupled to another code segment or a hardware circuit by passing and/ or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 2A:
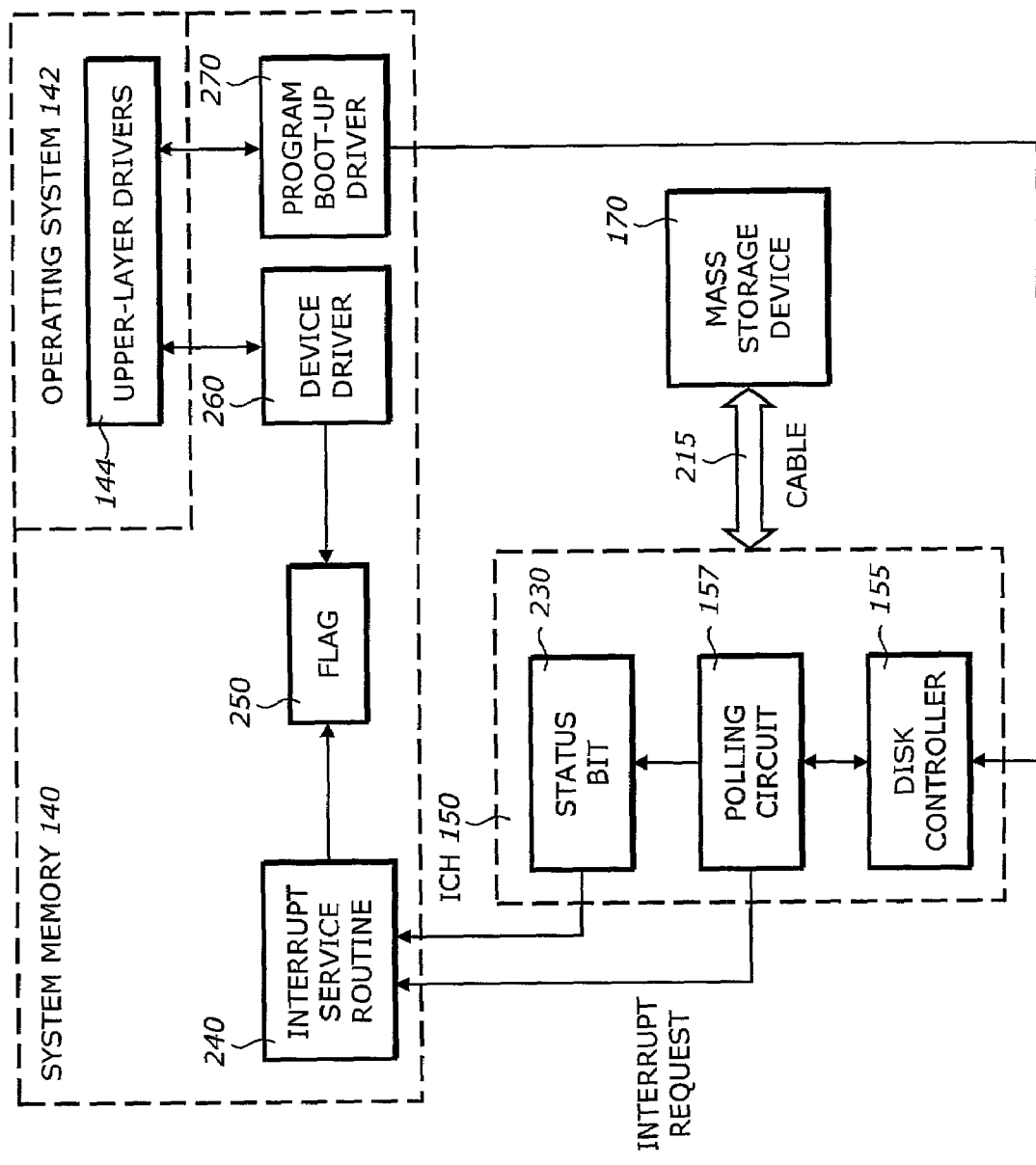
FIG. 2A is a diagram illustrating an auto poll mode with interrupt from a polling circuit to device driver according to one embodiment of the invention.

FIG. 2A is a diagram illustrating an auto poll mode with interrupt from a polling circuit to device driver according to one embodiment of the invention.

The ICH 150 (FIG. 1) includes the disk controller 155, the polling circuit 157, and a status bit 230. The disk controller 155 controls the mass storage device 170. In one embodiment, the disk controller is an IDE disk controller and the mass storage device 170 is an IDE hard disk drive or CD-ROM drive. The polling circuit 157 polls the mass storage device 170 periodically to determine if a medium such as a CD-ROM is inserted into the mass storage device 170. The polling may be performed according to standard protocol via the cable 215. Since the polling circuit 157 is a hardware mechanism designed to poll the mass storage device 170 externally to the processor 110 (FIG. 1), the processor 110 does not need to execute a polling routine or program. This results in increased processor performance because the processor 110 is free to perform other tasks. When the polling circuit 157 detects an insertion of a medium into the mass storage device 170, it sets the status bit 230 and generates an interrupt to the processor 110. The status bit 230 may be in a status register with address mapped into the processor's memory space. The state of the status bit 230 indicates the result of the polling performed by the polling circuit 157 and the status change of the medium. For example, the status bit may indicate if a new medium is inserted into the drive, or an inserted medium is removed from the drive.

The memory 140 includes an interrupt service routine 240, a flag 250, a device driver 260, a program boot-up driver 270, and the operating system 142. The operating system 142 includes the upper-layer drivers 144. When the processor 110 receives an interrupt request from the polling circuit 157, it executes the interrupt service routine 240. The interrupt service routine 240 includes program code to check the status bit 230. The status bit 230 indicates change of the medium, whether the medium is inserted or removed from the drive. The interrupt service routine 240 updates a flag in the memory 140 according to the status bit 230. The state of the flag 250 indicates whether or not an insertion or removal of a medium has been detected. For example, if the flag 250 is cleared, no insertion has been detected; if the flag 250 is set, an insertion has been detected by the polling circuit 157.

The device driver 260 includes program code that reads the flag 250 to determine if an insertion has been detected. The device driver 260 may be a polling function to poll the state of the flag 250 instead of polling the state of the mass storage device 170. Since polling or inquiring the state of a memory location is a lot faster than polling the mass storage device 170, the device driver 260 saves a significant amount of time for polling. The device driver 260 reports the state of the flag 250 back to the upper-layer drivers 144. If the flag 250 is set, indicating that a medium has been inserted into the mass storage device 170, the upper-layer drivers 144 may initiate the program boot-up driver 270 to start loading a program on the inserted medium. For example, the program boot-up driver 270 may load an executable code on a CD-ROM so that the processor 110 may begin execute this executable code without user's manual control.

Figure 2B:
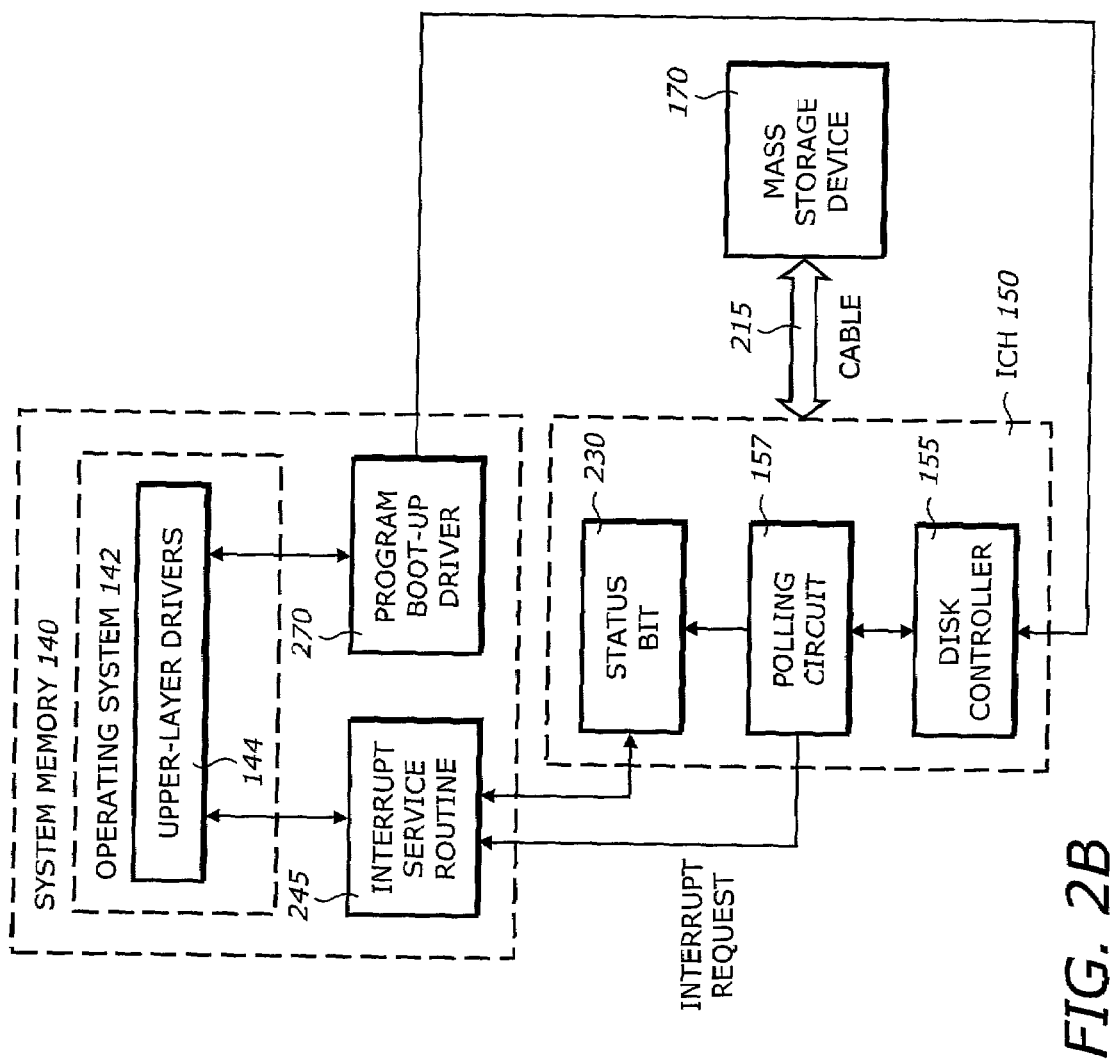
FIG. 2B is a diagram illustrating an auto poll mode with interrupt from a polling circuit to upper-level driver according to one embodiment of the invention.

FIG. 2B is a diagram illustrating an auto poll mode with interrupt from a polling circuit to upper-level driver according to one embodiment of the invention. This mode retains most of the elements of the embodiment shown in FIG. 2A except that the interrupt service routine 240 is replaced by an interrupt service routine 245. In addition, the flag 250 and the polling device driver 260 are not needed.

This mode of operation is essentially similar to the mode shown in FIG. 2A except that there is no polling device driver 260. In other words, the interrupt service routine 245 directly interacts with the upper-layer drivers 144. For example, the interrupt service routine 245 may make a call to the operating system 142 to direct the upper-layer drivers 144 to invoke the program boot-up driver 270. The program boot-up driver 270 then starts loading an executable code on the inserted medium. In this embodiment, the existing operating system 142 or the upper-layer drivers 144 is modified to eliminate the polling effort. Instead, as soon as the interrupt service routine 245 is started, the upper-lay drivers 144 may invoke the program boot-up driver 270. In this way, the operating system 142 is relieved of the polling and can respond to the interrupt caused by the polling circuit 157 quickly.

Figure 2C:
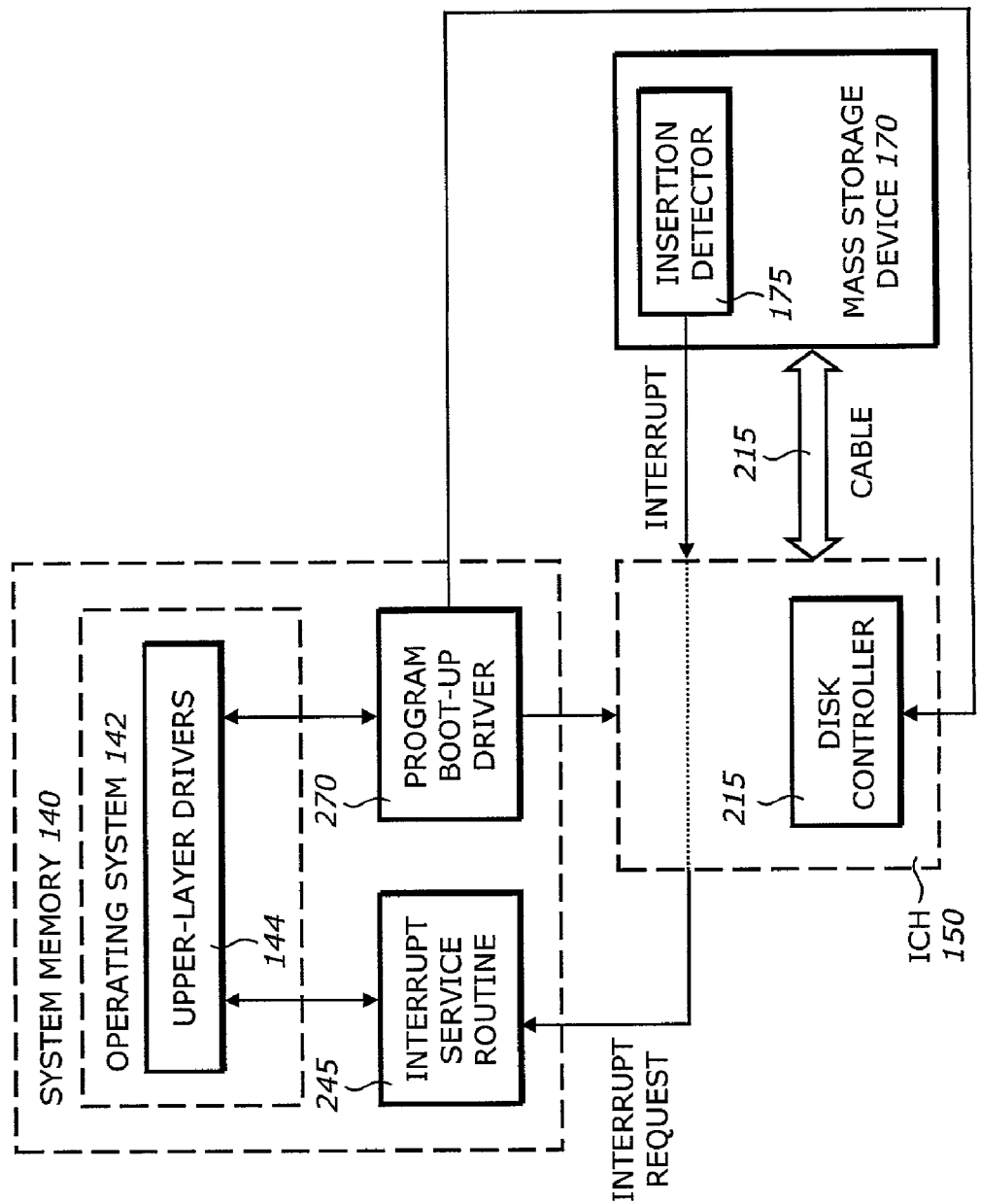
FIG. 2C is a diagram illustrating a no poll mode with interrupt from the drive according to one embodiment of the invention.

FIG. 2C is a diagram illustrating a no poll mode with interrupt from the drive according to one embodiment of the invention.

In this mode, the mass storage device 170 includes the insertion detector 175 (FIG. 1). The insertion detector 175 may be a circuit located within the mass storage device 170 to determine if a medium s inserted into the mass storage device 170, or when a tray is shut with a medium on it. Normally, if the mass storage device 170 include IDE drives, this interrupt may not be generated. This is because the IDE cable (e.g., cable 215) is shared by two drives, e.g., a hard drive and a CD-ROM. The CD-ROM may not generate an interrupt when the hard drive is in use. In one embodiment, the mass storage device 170 is a serial ATA device so that the mass storage device 170 may generated an interrupt request directly to the chipset 150.

When the processor 110 receives the interrupt request forwarded by the chipset 150, it executes the interrupt service routine 245. The interrupt service routine 245 then interacts with the upper-layer drivers 144 to indicate that an insertion of a medium has been detected. Upon being informed that an insertion is detected, the upper-layer drivers 144 invokes the program boot-up driver 270. The program boot-up driver 270 then starts loading an executable code on the medium into the memory 140. The processor 110 then proceeds to execute this code in a similar manner as discussed above.

Similar to the embodiment shown in FIG. 2B, the operating system 142 and/or the upper-layer drivers 144 does not include a polling routine. By eliminating the polling in the operating system 142, a faster response to automatically load a program on the medium can be achieved.

Any one of the above embodiments can be implemented separately or together to provide flexibility with different chipset architectures or mass storage devices. In addition, to maintain compatibility with existing operating systems which include a polling function such as the device driver 260, a multi-mode configuration scheme may be used.

Figure 3:
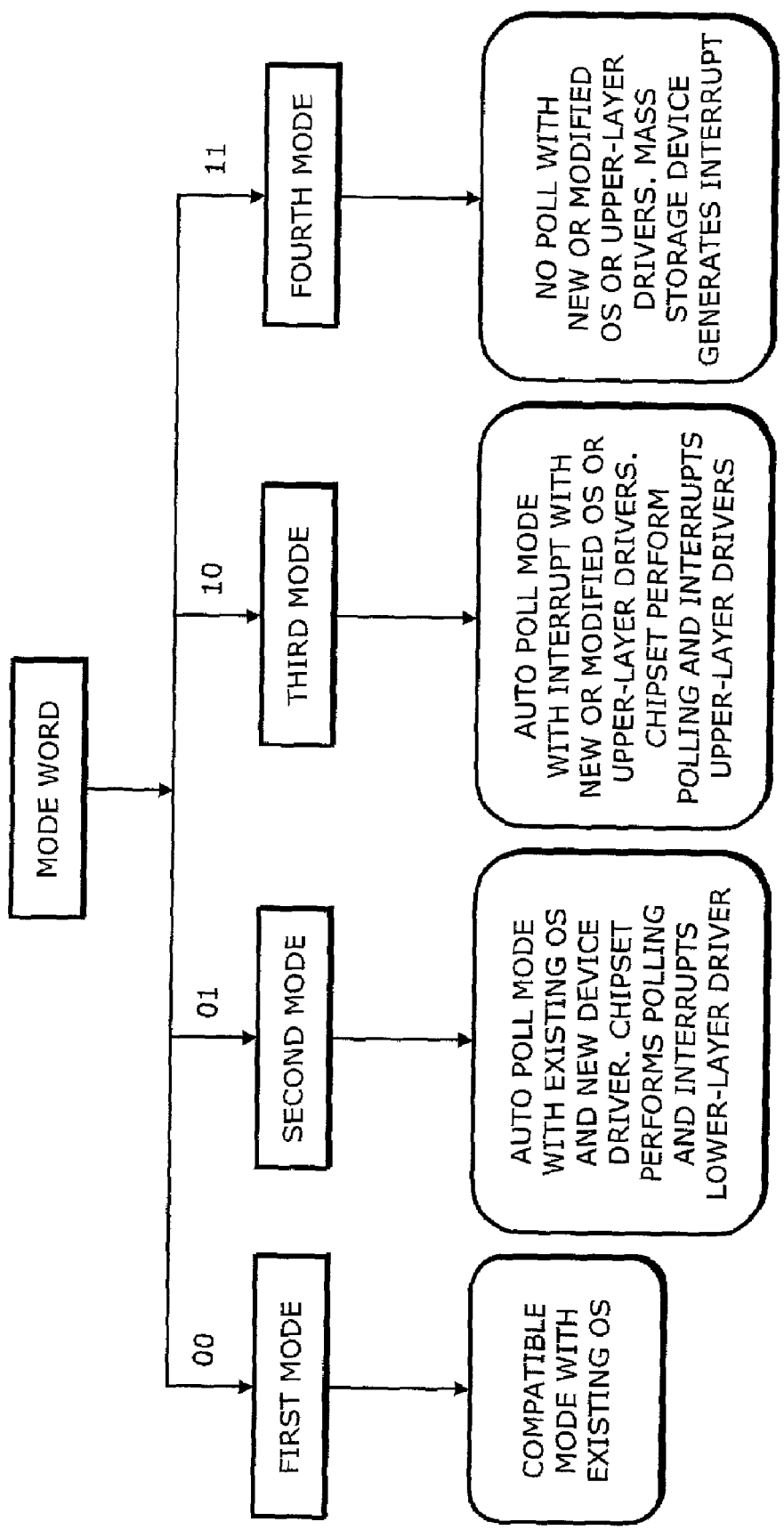
FIG. 3 is a diagram illustrating a mode word configuration according to one embodiment of the invention.

FIG. 3 is a diagram illustrating a mode word configuration according to one embodiment of the invention. The configuration includes configuring or program a mode word 310 to set up the operational mode of the insertion detection schemes.

The mode word 310 may be located in the chipset 150 or as part of a configuration map stored in a non-volatile memory during system boot-up. The mode word 310 may be implemented as two bits indicating the four operational modes corresponding to the four embodiments as discussed above. For example, the mode word may be set to correspond to the four modes as follows: 00 (first mode), 01 (second mode), 10 (third mode), and 11 (fourth mode).

The first mode corresponds to the compatible mode, i.e., the existing mode where the operating system polls the mass storage device. This mode is used to allow compatibility with existing chipset and operating system without modification.

The second mode corresponds to the embodiment described in FIG. 2A. This mode is the auto poll mode with existing operating system and a new lower-layer device driver. This mode requires a polling circuit in the chipset. The polling circuit generates an interrupt when it detects an insertion of a medium into the drive. The new device driver reads the flag in the memory to determine if an insertion has been detected.

The third mode corresponds to the embodiment described in FIG. 2B. This mode is the auto poll mode with interrupt with new or modified operating system. This mode also requires a polling circuit in the chipset. The polling circuit generates an interrupt to be serviced by the upper-layer drivers in the operating system. This mode eliminates polling from the operating system.

The fourth mode corresponds to the embodiment described in FIG. 2C. This mode is the no poll mode with new or modified operating system. This mode does not require a polling circuit in the chipset, but it requires the mass storage device to have an insertion detector. The insertion detector generates an interrupt to the upper-layer drivers when a medium is inserted into the drive.

Figure 4:
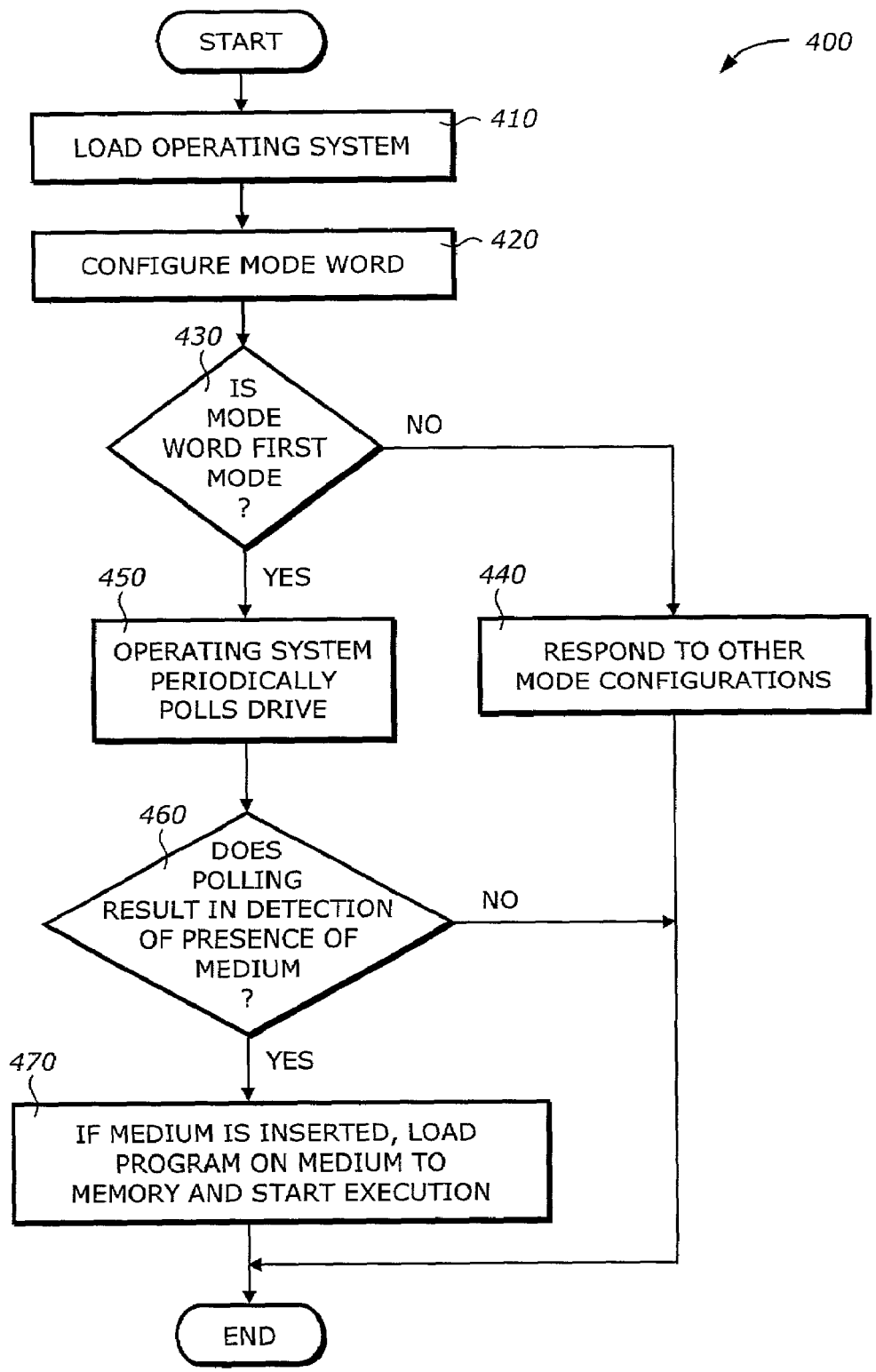
FIG. 4 is a flowchart illustrating a process to detect insertion of medium according to one embodiment of the invention.

FIG. 4 is a flowchart illustrating a process 400 to detect insertion of medium according to one embodiment of the invention.

Upon START, the process 400 loads the operating system into the main memory (Block 410). The operating system may be an existing version with the polling driver, or a new or modified version. Then, the process 400 configures the mode word according to the environment (Block 420). The process 400 may detect that the chipset has a polling circuit, or the drive has an insertion detector circuit.

The process 400 determines if the mode word is the first mode (Block 430). If not, the process 400 responds to other mode configurations (Block 440). Block 440 is described in FIG. 5. Then, the process 400 is terminated. If the mode word is the first mode, the operating system periodically polls the drive using the lower-layer device driver (Block 450). The process 400 determines if polling result in detection of insertion of a medium (Block 460). If not, the process 400 is terminated. Otherwise, the process 400 loads an executable program on the medium into the memory and starts execution (Block 470). The process 400 is then terminated.

Figure 5:
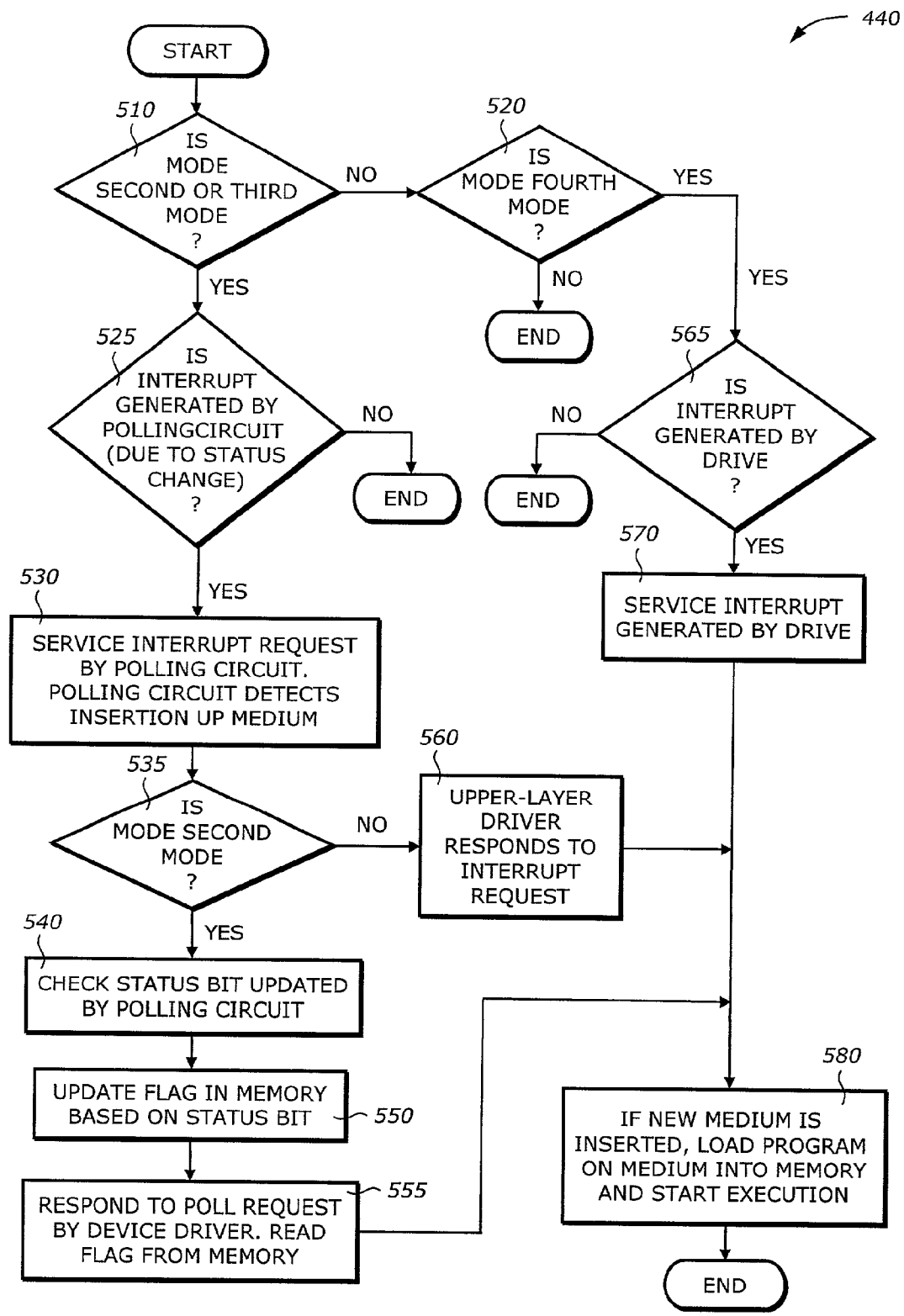
FIG. 5 is a flowchart illustrating a process to respond to other mode configurations shown in FIG. 4 according to one embodiment of the invention.

FIG. 5 is a flowchart illustrating the process 440 to respond to other mode configurations shown in FIG. 4 according to one embodiment of the invention.

Upon START, the process 440 determines if the mode is the second or the third mode (Block 510). If the mode is not the second or third mode, the process 440 goes to block 520. Otherwise, the process 440 determines if there is an interrupt generated by the polling circuit due to status change of the medium and/or the drive (Block 525). If not, the process 440 is terminated. Otherwise, the process 440 services the interrupt generated by the polling circuit in the chipset (Block 530). The polling circuit detects if there is an insertion of the medium into the drive. Next, the process 440 determines if the mode is the second mode (Block 535). If not, the process 440 goes to block 560. Otherwise, the process 440 checks the status bit updated by the polling circuit (Block 540). Next, the process 440 updates a flag in the memory based on the status bit depending on whether the status bit indicates a medium insertion or removal (Block 550). Then the process 440 responds to a poll request by the lower-layer device driver (Block 555). This response includes reading the flag by the device driver. Then the process 440 loads an executable program on the medium into the memory and starts execution of the loaded program if the status bit indicates a medium insertion and there is an executable program on the medium (Block 580). The process 440 is then terminated.

At block 560, the process 440 responds to the interrupt request using the upper-layer drivers. Then, the process goes to Block 580 to perform operations as described above and is then terminated.

At block 520, the process 440 determines if the mode is the fourth mode (Block 520). If not, the process 440 is terminated. Otherwise, the process 440 determines if an interrupt is generated by the drive or mass storage device (Block 565). If not, the process 440 is terminated. Otherwise, the process 440 services the interrupt generated by the drive (Block 570). Next, the process 440 goes to Block 580 to perform operations as described above and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    configuring a mode word in one of first, second, third, and fourth modes in a chipset or in a configuration map stored in a non-volatile memory during boot-up;
    detecting insertion of a medium into a drive based on the mode word, detecting the insertion comprising servicing an interrupt indicating the insertion of the medium when the mode is configured in one of the second, third, and fourth modes, wherein servicing the interrupt comprises servicing the interrupt generated by a polling circuit in the chipset when the mode is configured in one of the second and third modes, the polling circuit detecting the insertion of the medium; and
    starting a program on the medium when the insertion is detected; wherein servicing the interrupt comprises:
    checking a status bit set by the polling circuit when the mode is configured in the second mode;
    updating a flag in a memory based on the status bit; and
    responding to a poll request by an operating system.

2. The method of claim 1 wherein detecting the insertion comprises:
    periodically polling the drive when the mode word is configured in the first mode.

3. The method of claim 1 wherein responding comprises:
    reading the flag from the memory.

4. The method of claim 1 wherein servicing the interrupt comprises:
    servicing the interrupt generated by the drive when the mode is configured in the fourth mode.

5. A computer program product comprising:
    a machine useable medium having computer program code embedded therein, the computer program product having:
        computer readable program code to configure a mode word in one of first, second, third, and fourth modes in a chipset or in a configuration map stored in a non-volatile memory during boot-up;
        computer readable program code to detect insertion of a medium into a drive based on the mode word, wherein the computer readable program code to detect the insertion comprises computer readable program code to service an interrupt indicating the insertion of the medium when the mode is configured in one of the second, third, and fourth modes, wherein the computer readable program code to service the interrupt comprises computer readable program code to service the interrupt generated by a polling circuit in the chipset when the mode is configured in one of the second and third modes, the polling circuit detecting the insertion of the medium; and
        computer readable program code to start a program on the medium when the insertion is detected;
    wherein the computer readable program code to service the interrupt comprises:
        computer readable program code to check a status bit set by the polling circuit when the mode is configured in the second mode;
        computer readable program code to update a flag in a memory based on the status bit; and
        computer readable program code to respond to a poll request by an operating system.

6. The computer program product of claim 5 wherein the computer readable program code to detect the insertion comprises:
    computer readable program code to periodically poll the drive when the mode word is configured in the first mode.

7. The computer program product of claim 5 wherein the computer readable program code to respond comprises:
    computer readable program code to read the flag from the memory.

8. The computer program product of claim 5 wherein the computer readable program code to service the interrupt comprises:
    computer readable program code to service the interrupt generated by the drive when the mode is configured in the fourth mode.

9. A system comprising:
    a processor;
    a chipset coupled to the processor to control a drive; and
    a memory coupled to the processor to store instruction code, the instruction code, when executed by the processor, causing the processor to:
        configure a mode word in one of first, second, third, and fourth modes in the chipset or in a configuration map stored in a non-volatile memory during boot-up,
        detect insertion of a medium into the drive based on the mode word, wherein the instruction code causing the processor to detect insertion causes the processor to service an interrupt indicating the insertion of the medium when the mode is configured in one of the second, third, and fourth modes, wherein the instruction code causing the processor to service the interrupt causes the processor to service the interrupt generated by a polling circuit in the chipset when the mode is configured in one of the second and third modes, the polling circuit detecting the insertion of the medium, and
        start a program on the medium when the insertion is detected; and wherein the instruction code causing the processor to service the interrupt causes the processor to:
        check a status bit set by the polling circuit when the mode is configured in the second mode;
        update a flag in a memory based on the status bit; and
        respond to a poll request by an operating system.

10. The system of claim 9 wherein the instruction code causing the processor to detect insertion causes the processor to:
    periodically poll the drive when the mode word is configured in the first mode.

* * * * *